(12) United States Patent
Silsby

(10) Patent No.: US 9,083,904 B2
(45) Date of Patent: Jul. 14, 2015

(54) SYSTEMS AND METHODS FOR PROVIDING SHIFTABLE COLUMN CIRCUITRY OF IMAGER PIXEL ARRAYS

(71) Applicant: Semiconductor Components Industries, LLC, Phoenix, AZ (US)

(72) Inventor: Christopher Dean Silsby, Albany, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/454,222

(22) Filed: Aug. 7, 2014

(65) Prior Publication Data

US 2015/0062398 A1    Mar. 5, 2015

Related U.S. Application Data

(62) Division of application No. 12/956,470, filed on Nov. 30, 2010, now Pat. No. 8,830,334.

(51) Int. Cl.
| | |
|---|---|
| *H04N 5/357* | (2011.01) |
| *H04N 5/374* | (2011.01) |
| *H04N 5/445* | (2011.01) |
| *H04N 5/367* | (2011.01) |
| *H04N 5/217* | (2011.01) |

(52) U.S. Cl.
CPC ........... *H04N 5/3741* (2013.01); *H04N 5/2176* (2013.01); *H04N 5/357* (2013.01); *H04N 5/367* (2013.01); *H04N 5/44508* (2013.01)

(58) Field of Classification Search
CPC . H04N 5/3741; H04N 5/44508; H04N 5/357; H04N 5/367; H04N 5/2176; H04N 5/361; H04N 7/52

USPC .......... 348/14.11, 211.5, 243, 246, 248, 251, 348/343, 615, E5.081
See application file for complete search history.

(56) References Cited

U.S. PATENT DOCUMENTS

| | | | |
|---|---|---|---|
| 5,231,604 A | 7/1993 | Watanabe | |
| 5,434,514 A | 7/1995 | Cliff et al. | |
| 7,511,748 B2 | 3/2009 | Kagle et al. | |
| 7,554,066 B2 | 6/2009 | Yan | |
| 7,852,391 B2 * | 12/2010 | Tinkler et al. | 348/302 |
| 8,174,284 B1 | 5/2012 | Lewis | |
| 8,451,348 B2 * | 5/2013 | Tay | 348/241 |
| 8,941,471 B2 * | 1/2015 | Shafer | 340/10.3 |
| 9,008,445 B2 * | 4/2015 | Murata et al. | 382/216 |
| 2006/0125940 A1 | 6/2006 | Tinkler et al. | |
| 2008/0158363 A1 * | 7/2008 | Myers | 348/187 |

* cited by examiner

*Primary Examiner* — Hung Lam
(74) *Attorney, Agent, or Firm* — Robert F. Hightower

(57) ABSTRACT

This is generally directed to systems and methods for providing shiftable column circuitry for a pixel array of an imaging system. Columns of a pixel array can be switchably coupled (e.g., through multiplexers) to their default column circuitry as well as coupled to one or more instances of a neighboring column's column circuitry. In response to an instance of default column circuitry being identified as defective, its corresponding column may "shift" and choose to couple to the neighboring column circuitry. Similarly, all following columns may also shift and couple to a neighboring column circuitry. In some embodiments, the defective column circuitry can be identified during wafer testing and identifying information (e.g., an address) of the defective column circuitry stored in memory. The identifying information may then be accessed from memory and, during an image signal readout phase, used to suitably shift the columns to avoid the defective column circuitry.

9 Claims, 8 Drawing Sheets

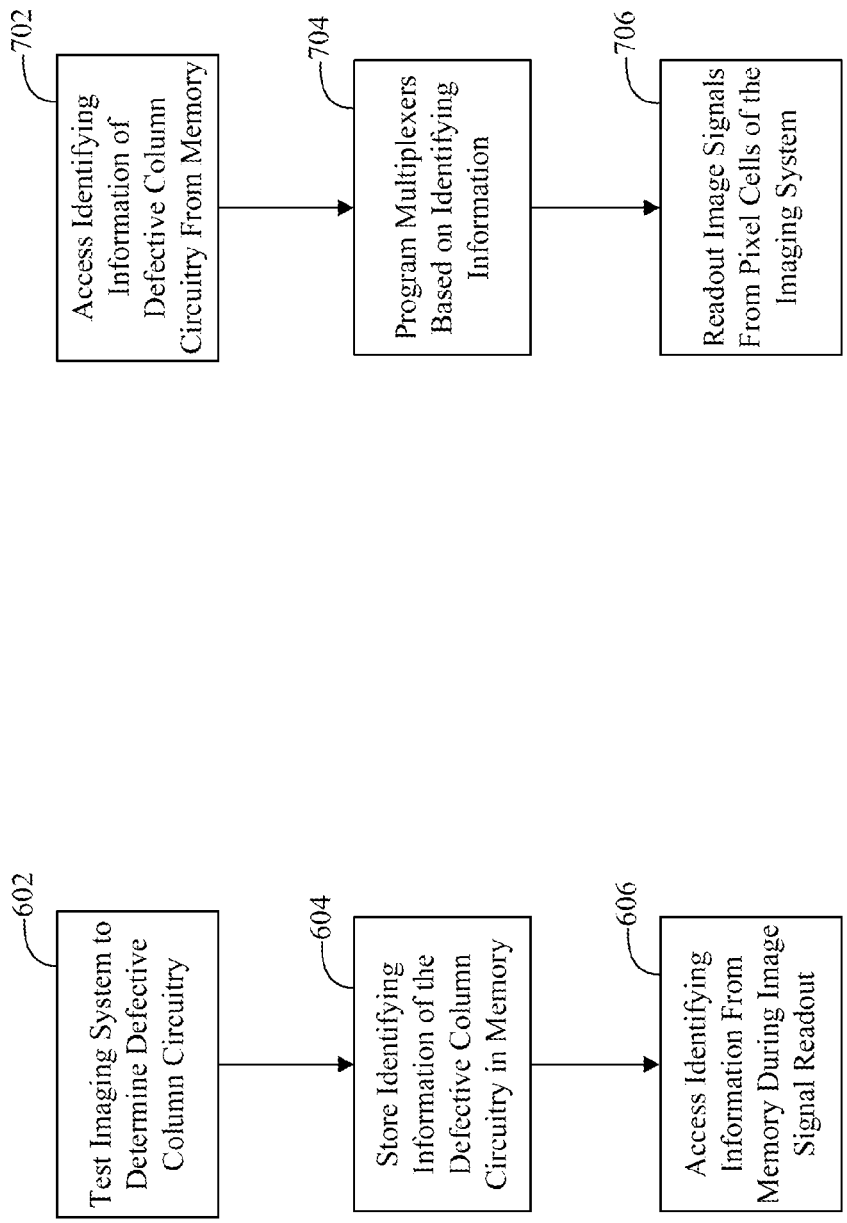

SYSTEMS AND METHODS FOR PROVIDING SHIFTABLE COLUMN CIRCUITRY OF IMAGER PIXEL ARRAYS

This application is a divisional of U.S. application Ser. No. 12/956,470 filed on Nov. 30, 2010.

FIELD OF THE INVENTION

The present invention relates to systems and methods for providing improved column circuitry of imager pixel arrays. In particular, this can relate to imaging systems and methods in which at least one instance of column circuitry can be switchably coupled to two or more columns of a pixel array.

BACKGROUND OF THE INVENTION

Imaging systems today often include an array of pixel cells arranged in a predetermined number of columns and rows. Each of the pixel cells can be configured to sense an amount of light impinging on that pixel cell, and generate an appropriate image signal corresponding to that amount of sensed light.

Each column of the pixel array can include its own column line, where this column line couples all pixel cells of their respective column together. Each column line, in turn, can be coupled to column circuitry, such that each column of the pixel array is associated with its own instance of column circuitry. When a pixel cell has generated an image signal, at the appropriate timing the pixel cell can output this image signal onto the column line and to the column circuitry. The column circuitry may then perform any suitable processing of the image signal such as, for example, sampling the image signal, storing the image signal (e.g., on a capacitor), amplifying the image signal, performing correlated double sampling ("CDS") on the image signal, passing the image signal to further image processing systems, and the like.

In some cases, however, an instance of column circuitry associated with a particular column can be defective or otherwise operate non-ideally. In other words, due to the defective column circuitry, image signals from that particular column may become corrupted and inaccurate, or it may even be impossible to obtain image signals from the pixel cells of that column. Accordingly, using the corrupted image signals can result in image degradation and loss of quality and accuracy. In some cases, to avoid such corrupted image signals, data from the affected columns can simply be discarded and not used. Interpolation or other estimation techniques may then be applied to attempt to estimate the correct values sensed by the pixel cells coupled to the defective column circuitry. However, once again, such estimation techniques can result in inaccuracies in the image data and in image degradation.

BRIEF DESCRIPTION OF THE FIGURES

FIG. 6 shows an illustrative flowchart for a calibrating a memory for use in shifting column circuitry in accordance with some embodiments of the present inventions.

FIG. 7 shows an illustrative flowchart for shifting column circuitry in accordance with some embodiments of the present inventions.

DETAILED DESCRIPTION OF THE INVENTION

Figure 1:
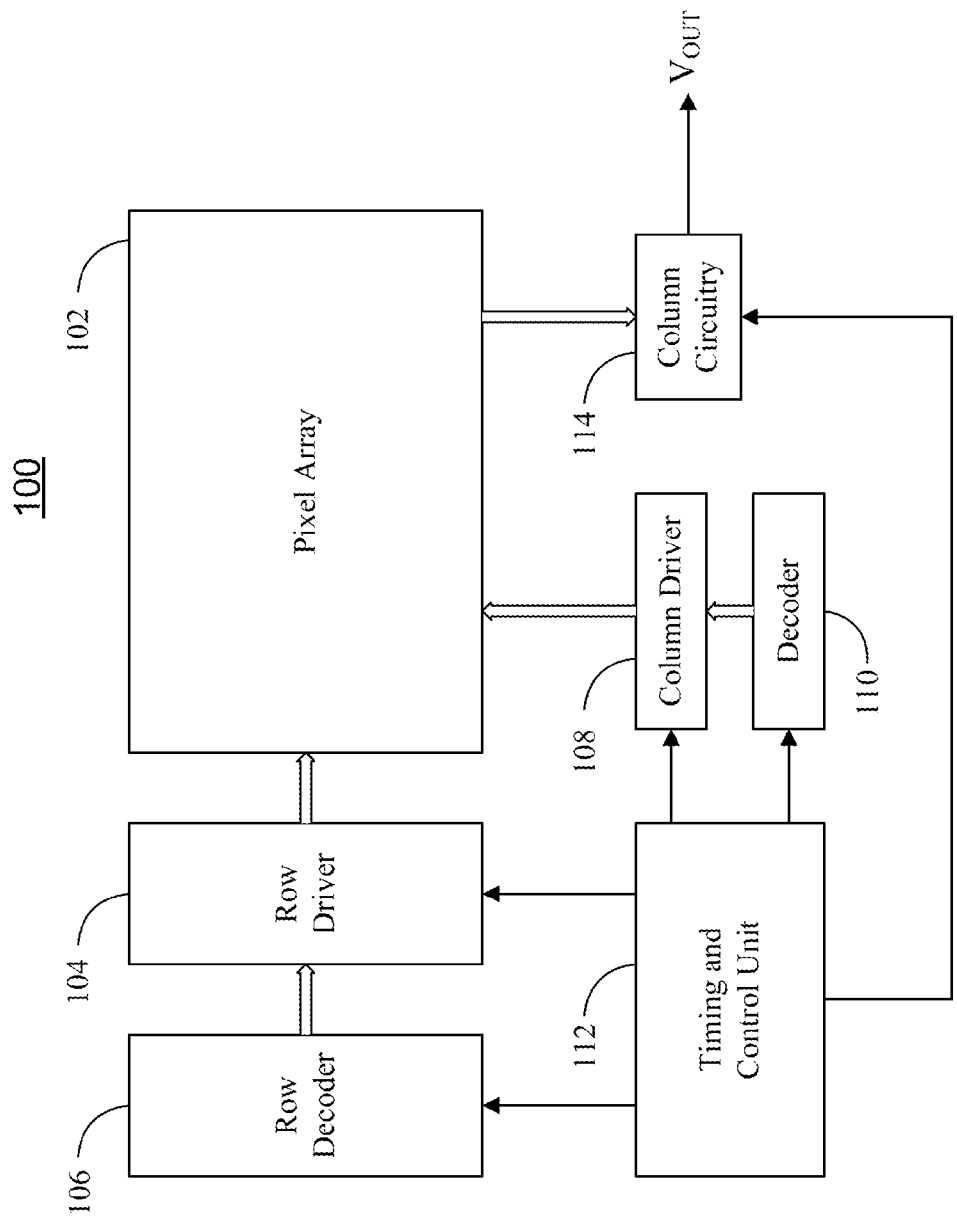
FIG. 1 shows a schematic view of an illustrative imaging system in accordance with some embodiments on the present invention.

FIG. 1 shows a schematic view of illustrative imaging system 100 in accordance with some embodiments of the present invention. Imaging system 100 can include an imaging system included in any suitable electronic device such as, for example, a camera, a video camcorder, a cellular phone camera, and image recognition system, and the like. In some embodiments, imaging system 100 could represent a complimentary metal oxide semiconductor ("CMOS") imagining system. However, although imaging system 100 and the following embodiments may refer to the particular example of a CMOS imaging system, this is merely for the purpose of illustration and not for limitation. Rather, one skilled in the art could appreciate that any other suitable imaging system could alternatively be used. Moreover, in some embodiments, one or more of the components of imaging system 100 can be combined, omitted, or can included several instances of the components, or imaging system 100 can include other components not included in those shown in FIG. 1.

Imaging system 100 can have pixel array 102 that can included pixels cells arranged in a predetermined number of columns and rows. In operation, rows and columns of pixel cells of pixel array 102 can be selectively activated and/or read from pixel array 102. For example, the rows can be selectively activated by row driver 104 in response to row driver 104 receiving a row address from row decoder 106. Similarly, the columns can be selectively activated by column driver 108 in response to column driver 108 receiving a column address from column decoder 110. In this manner, each pixel cell of pixel array 102 can be selectively activated and/or read from pixel array 102 by providing the appropriate row and column address with, respectively, row decoder 106 and column decoder 110.

Timing and control unit 112 can instruct row decoder 106 and column decoder 110 to select an appropriate row and column line, thus selecting a particular pixel cell for signal readout. Furthermore, timing and control unit 112 can apply driving voltages (e.g., control signals) to the particular pixel cell and to column circuitry 114, thereby enabling the capture and reading of image signals generated by the pixel cells. As will be described in greater detail below, generally an instance of column circuitry 114 can be provided for each column of pixel array 102. In some embodiments, the pixel cells of pixel array 102 can be read out in a sequential manner. For example, through timing and control unit 112, the image signals from pixel cells can be sequentially readout in single row (e.g., starting with a readout of a first pixel cell, then a second pixel cell, then a third pixel cell, and so forth until the last pixel cell in the row is readout), then the image signals from pixel cells in a next row can be sequentially readout out, and so forth until the image signals from pixel cells of a final row are readout. Reading out all pixels cells of the pixel array a single time can be referred to herein as reading out or sampling a "frame" of the image. Alternatively, rather then being readout in a sequential order, the pixel cells of a frame may be readout in any other suitable order. By repeating the readout of the pixel array such that multiple frames are captured over time, a video can be captured by imaging system 100.

As described above, column circuitry 114 can be controlled by timing and control unit 112. During sampling of the pixel cells, each pixel cell of pixel array 102 can output an image signal which may be received by column circuitry 114. In some embodiments, this "image signal" may consist of multiple signals. For example, in some cases a pixel cell can be sampled twice to readout a reference level signal ("$V_{RST}$") and a signal level ("$V_{SIG}$"). A correlated double sampling ("CDS") process may then be used to determine a resulting output image signal by taking the difference of $V_{RST}$ and $V_{SIG}$. In particular, when the term "image signal" is used herein, one skilled in the art could appreciate that this can refer to any suitable signal or signals readout from a pixel cell in order to determine an associated amount of light sensed by that pixel, and thus can include cases where one signal is readout from a pixel cell, where two signals are readout from a pixel cell (e.g., for use in CDS), or where any other suitable number of signals are readout.

In operation, row driver 104 can select an indicated row for the capture and reading of image signals from the pixel cells of that row. Column driver 108 can then select each pixel cell of the selected row for delivery to column circuitry 114. Column circuitry 114 may then perform any suitable processing of the image signals. For example, column circuitry 114 may sample, hold, and/or amplify the image signal. In some embodiments, column circuitry 114 can perform correlated double sampling (e.g., when $V_{RST}$ and $V_{SIG}$ are both output from each pixel cell) to determine a differential output image signal. In this case, column circuitry 114 may include capacitors, where one capacitor can be used to store the $V_{RST}$ signal and one can be used to store the $V_{SIG}$ signal. In some embodiments, column circuitry 114 can perform analog-to-digital conversion on the image signal. After performing any of the above-mentioned processing or any other suitable processing on the image signal, column circuitry 114 may then provide the output signal, $V_{OUT}$. $V_{OUT}$ can be used by imaging system 100 in any suitable manner or have any suitable image processing performed on it. For example, in some cases noise reduction, image dewarping, image rotations, image perspective adjustments, image panning, image tilting, imaging zooming, or any other suitable image processing can be performed on $V_{OUT}$.

Figure 2:
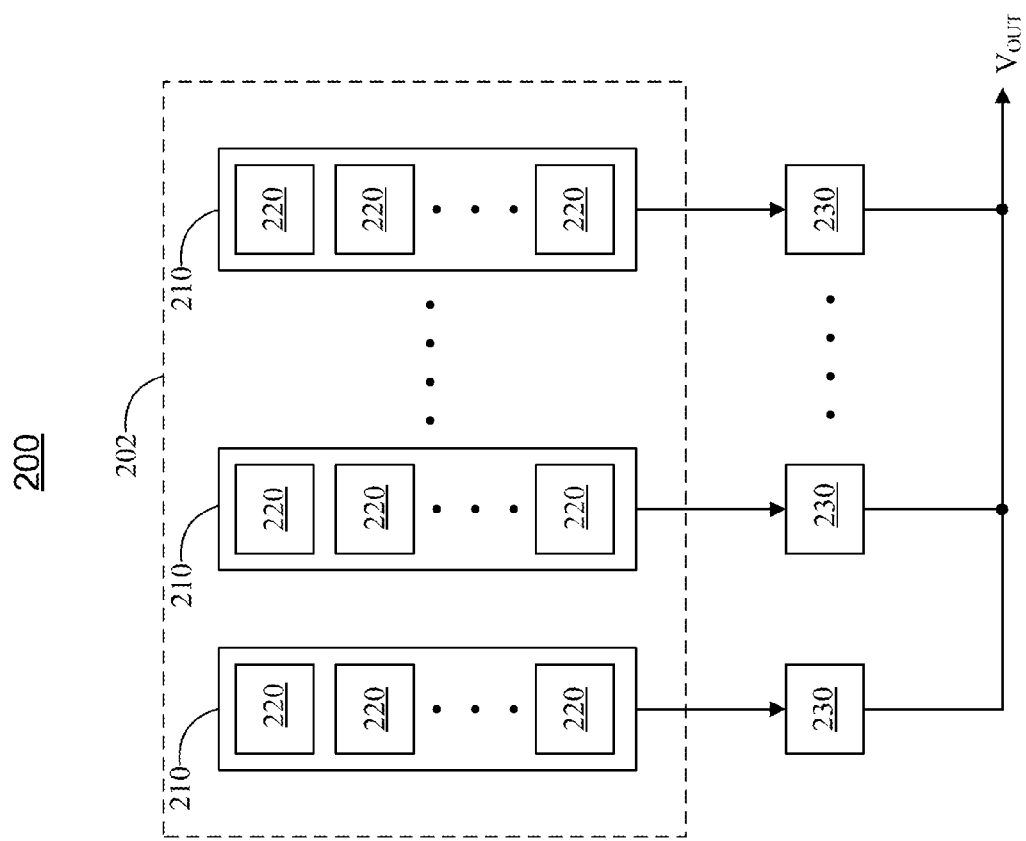
FIG. 2 shows a schematic view of an illustrative pixel array in accordance with some embodiments of the present inventions.

FIG. 2 shows a schematic view of an illustrative pixel array 202 of imaging system 200. For example, pixel array 202 can correspond to a more detailed view of pixel array 102 of FIG. 1 that illustrates the columns and rows of a pixel array. Each column 210 of pixel array 202 can include two or more rows of pixel cell 220. Each column 210 can include an associated column circuitry 230, where signals from each pixel cell 220 can be read out by its associated column circuitry 230. For example, some or all components of column circuitry 230 can correspond to column circuitry 114 of FIG. 1. As an illustration, during sampling of pixel array 202, a particular row can be selected, thus causing the image signals of the pixel cells of the selected row to be received and stored in and/or processed by their respective column circuitry 230. These image signals stored in column circuitry 230 can then be read column-by-column (e.g., in a sequential order, or in any other suitable order) and provided to imaging system 200 for any other further suitable uses or processing. This process may then be repeated on the other rows of pixel array 202 (e.g., in a sequential row order, or in any other suitable order) to readout an entire frame.

In some cases, one or more instances of column circuitry 230 can be defective or otherwise operate non-ideally. This can cause the $V_{OUT}$ signals produced by the defective column circuitry to be erroneous or otherwise inaccurately portray the image signals generated by the pixel cells of the associated column. This, in turn, can result in image degradation and loss of quality for the imaging system. In some embodiments, the erroneous $V_{OUT}$ signals can be discarded and/or interpolation or other estimation techniques can be used to estimate the correct values of the image signals. However, these estimated image signals may still be inaccurate and otherwise incorrectly portray the real image signals actually generated by the pixel cells, once again resulting in image degradation and loss of quality.

Figure 3:
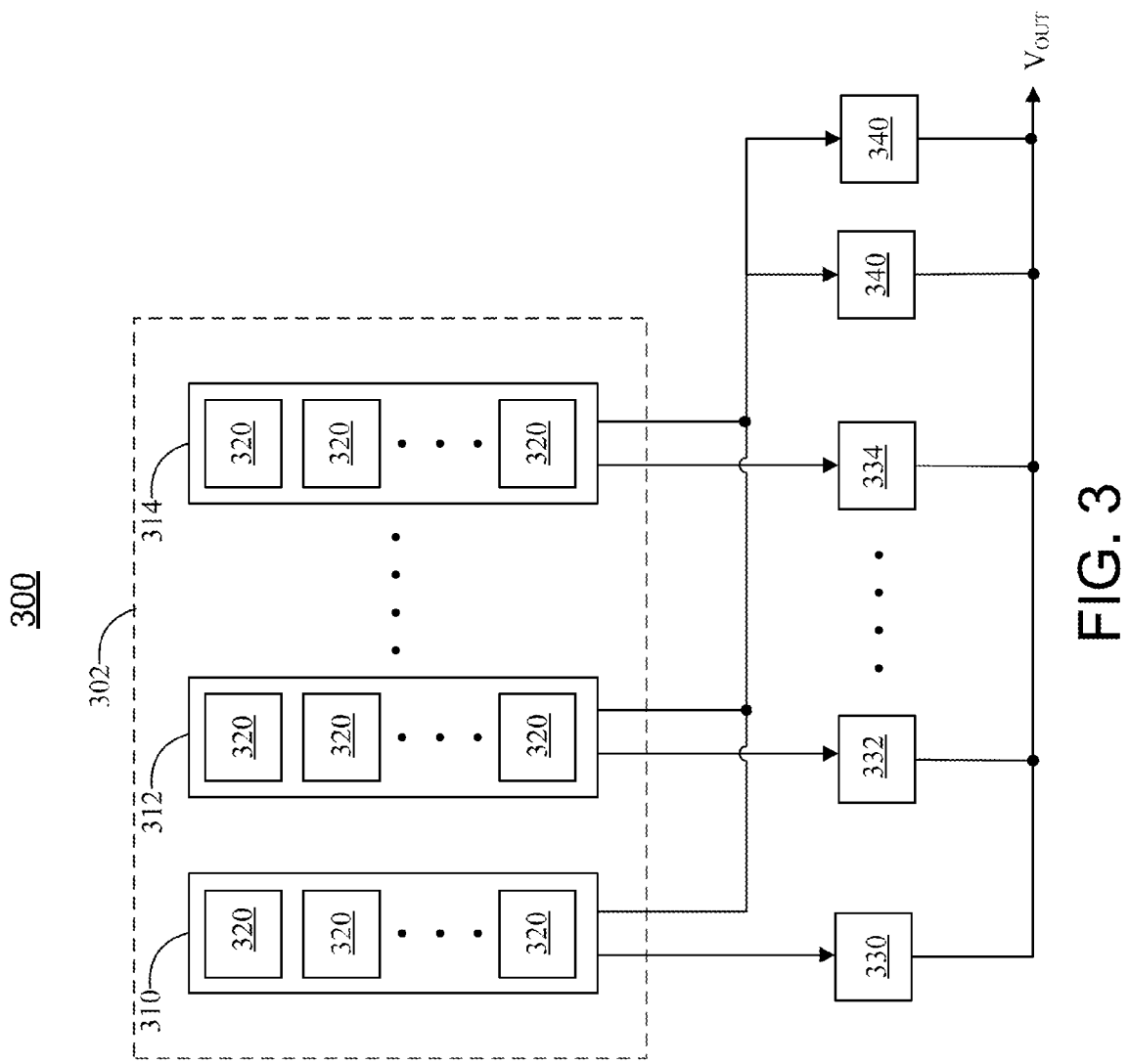
FIG. 3 shows a schematic view of an illustrative imaging system including at least one instance of alternative column circuitry in accordance with some embodiments of the present inventions.

Accordingly, in some embodiments, an imaging system can include one or more extra instances of column circuitry. In response to an instance of defective column circuitry being identified, the extra instance of column circuitry can be used in its place. Such extra instances of column circuitry are referred to herein as "alternative column circuitry" while column circuitry to which a column would normally be coupled (e.g., in the absence of defective column circuitry) is referred to herein as "default column circuitry." As an example, FIG. 3 shows imaging system 300 in which one or more instance of alternative column circuitry 340 can be provided. Although FIG. 3 illustrates two instances of alternative column circuitry 340, one skilled in the art could appreciate that any suitable number instances of alternative column circuitry 340 could alternatively be provided. For example, in some cases 4-8 instances of alternative column circuitry 340, or any other suitable number of instances of alternative column circuitry 340, can be provided in imaging system 300.

Similar to imaging system 200 of FIG. 2, imaging system 300 can include pixel array 302. Pixel array 302 can include two or more instance of columns. For example, FIG. 3 illustrates at least columns 310, 312, and 314. However, any other suitable number of columns could alternatively be provided. Each column of pixel array 302 can include two or more rows of pixel cell 320, and each column can be coupled to an associated default column circuitry (e.g., coupled to the default column circuitry through a column line). For example, column 310 is illustrated as being coupled to default column circuitry 330, column 312 is illustrated as being coupled to default column circuitry 332, and column 314 is illustrated as being coupled to default column circuitry 334. In addition, each column can be switchably coupled to the one or more instances of alternative column circuitry 340. In the event that one or more of default column circuitry 330, 332, and 334 are defective, the column associated with the defective column circuitry may alternatively use an instance of alternative column circuitry 340 (e.g., a multiplexer or other switch can be used to choose whether the default column circuitry or an instance of alternative column circuitry is used). As an illustration, in response to default column circuitry 330 being identified as defective, column 310 may alternatively be coupled to an instance of alternative column circuitry 340. As another illustration, in response to default column circuitry 330 and 332 both being identified as defective, column 310 may alternatively be coupled to one instance of alternative column circuitry 340 and column 312 may alternately be coupled to the other instance of alternative column circuitry 340. As mentioned above, multiplexers or other switches can be used to choose whether a column couples to its default column circuitry or to a particular instance of alternative column circuitry.

In some embodiments, the instance or instances of alternative column circuitry can be positioned such that they are physically close to the column or columns to which they are switchably coupled. This may, for example, help maintain "spatial accuracy" for the imaging system. For example, often times an imaging system may include a specific readout rate (e.g., which may be stipulated by customers or end users) at which the pixel cells should be sampled and processed (e.g., a next pixel cell is sampled every 2 microseconds, or the like). If a particular column is physically far from the column circuitry used to readout the particular column, the image signal may not arrive at the column circuitry fast enough to meet this readout rate. This can cause detrimental timing and/or electrical errors within the imaging system. As an illustration, since an image signal may arrive later than expected, the imaging system may erroneously sample and save the image signals as if it is associated with a different pixel location, thereby causing spatial errors and degrading the spatial accuracy of the imaging system.

Accordingly, in some embodiments, the alternative column circuitry can be positioned physically near the columns to which they are switchably coupled, thus preventing the loss of spatial information and maintaining the quality of the imaging system. For example, FIG. 4 shows imaging system 400 in which alternative column circuitry can be positioned physically close to the column or columns to which the alternative column circuitry is switchably coupled.

Similar to imaging system 300 of FIG. 3, imaging system 400 can include a pixel array 402 and can include two or more instance of columns. For example, FIG. 4 illustrates at least columns 410, 411, 412, 413, and 414 (e.g., although any other suitable number of columns could alternatively be provided). Each column of pixel array 402 can include two or more rows of pixel cell 420. Also similar to imaging system 300, each column can be coupled to its default column circuitry. For example, in the illustration of FIG. 4, the default column circuitry for column 410 can be column circuitry 430, the default column circuitry for column 411 can be column circuitry 431, the default column circuitry for column 412 can be column circuitry 432, the default column circuitry for column 413 can be column circuitry 433, and the default column circuitry for column 414 can be column circuitry 434. FIG. 4 also illustrates one instance of alternative column circuitry 440 (e.g., although any other suitable number of instances of alternative column circuitry may alternatively be provided).

Dissimilar to imaging system 300, however, in imaging system 400 at least one column may not be switchably coupled to the alternative column circuitry 440. Rather, columns may be switchably coupled to a physically adjacent column circuitry of a neighboring column through a multiplexer ("MUX"). The column may then use this neighboring column circuitry as its alternative column circuitry. For example, column 410 is illustrated in FIG. 4 as being switchably coupled to its alternative column circuitry (e.g., column circuitry 431) through MUX 450, column 411 is illustrated as being switchably coupled to its alternative column circuitry (e.g., column circuitry 432) through MUX 451, and so forth. As suitable, the columns near the end of the pixel array can be switchably coupled to the alternative column circuitry instead of or in addition to being coupled to the default column circuitry of a neighboring column. For example, FIG. 4 illustrates that the final column 414 can be switchably coupled to alternative column circuitry 440 through MUX 454.

Figure 4:
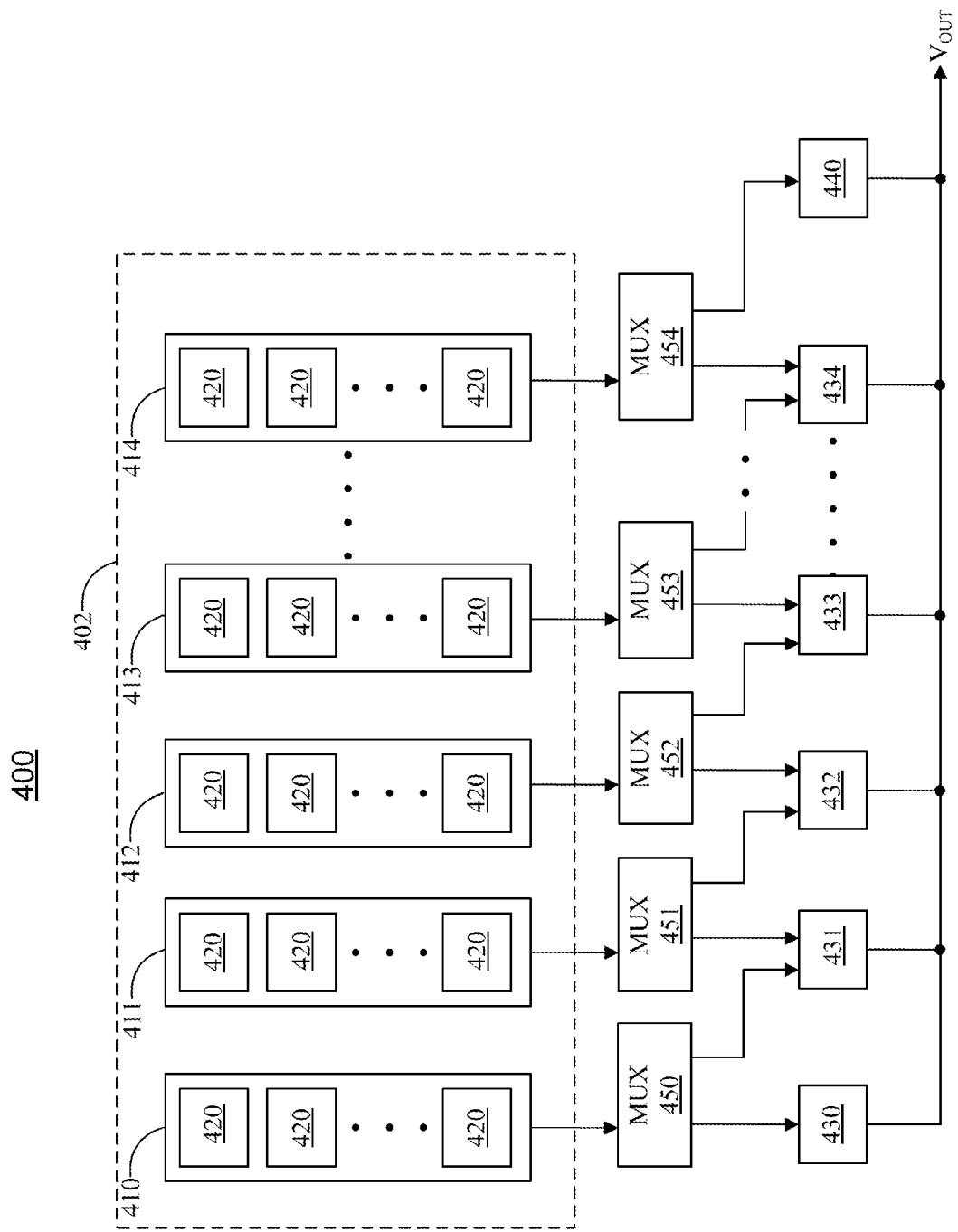
FIG. 4 shows a schematic view of an illustrative imaging system including at least one instance of a multiplexer and alternative column circuitry in accordance with some embodiments of the present inventions.

Once again, although only one instance of alternative column circuitry 440 is illustrated in FIG. 4, any other suitable number of alternative column circuitry can be included. For example, in some embodiments 4-8 instances of alternative column circuitry, or any other suitable number of instances of column circuitry, could alternatively be provided. As an illustration, when two instances of alternative column circuitry are provided, then each column may potentially be switchably coupled to two additional instances of adjacent column circuitry by their associated multiplexer in addition to their default column circuitry. For example, in this scenario, column 410 may be switchably coupled to column circuitry 430-432, column 411 may be switchably coupled to column circuitry 431-433, and the like. Similarly, when three instances of alternatively column circuitry are provided, then each column can be switchably coupled to three additional instances of column circuitry as well as being coupled to their default column circuitry, and so forth. As will be described in greater detail below, generally an imaging system can skip up to a number of instances of defective column circuitry that is equal to the number of instance of alternative column circuitry.

Figure 5:
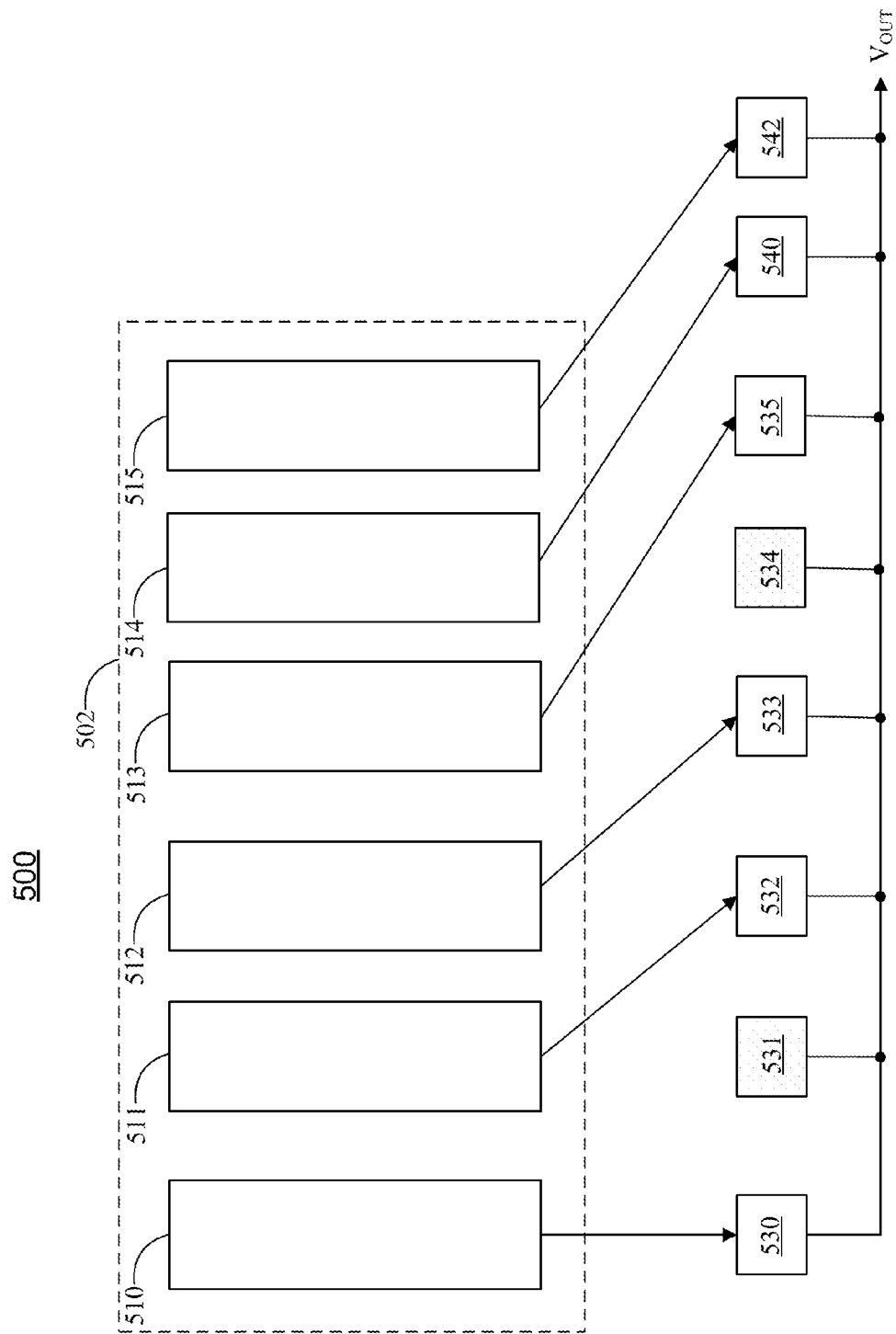
FIG. 5 shows a schematic view of an imaging system illustrating a shift of column circuitry in accordance with some embodiments of the present inventions.

In the system illustrated by FIG. 4, in response to defective column circuitry being identified, the column coupled to the defective column circuitry may instead couple to an adjacent column circuitry (e.g., through its associated multiplexer). The following columns may similarly couple to their respective adjacent column circuitry, thus causing all column circuitry following the defective column circuitry to "shift" in their coupling positions. As a specific illustration, FIG. 5 shows an exemplary situation with two instances of defective column circuitry. In FIG. 5, the multiplexers have not been drawn in order to simplify the schematic. Rather, merely the electrical coupling chosen by the multiplexers is illustrated.

In FIG. 5, imaging system 500 can include pixel array 502 that includes two or more instance of columns. For example, FIG. 5 illustrates columns 510, 511, 512, 513, 514, and 514 (e.g., although any other suitable number of columns could alternatively be provided). Each column of pixel array 502 can include two or more rows of pixel cells (not shown in FIG. 5 for simplicity). Imaging system 500 illustrates two instances of alternative column circuitry (e.g., alternative column circuitry 540 and 542), although any other suitable number of alternative column circuitry could alternatively be provided.

Accordingly, as two instances of alternative column circuitry are provided in imaging system 500, up to two instances of defective column circuitry can be skipped and avoided. For example, in FIG. 5, column circuitry 531 and 534 have been identified as defective column circuitry. Accordingly, column 511 may skip defective column circuitry 531 and instead couple to adjacent column circuitry 532 (e.g., through a multiplexer switchably coupling column 511 to column circuitry 532). As column 512 may no longer couple to its respective column circuitry 532, then column 512 may also "shift" and instead couple to its adjacent column circuitry 533. Similarly, any columns following column 512 may also shift one position and couple to the next adjacent column circuitry. In response to another defective column circuitry being identified, the following columns may shift one more additional position (e.g., the columns may now shift by two positions). For example, column circuitry 534 is also illustrated as defective in FIG. 5. Thus, it may not be desirable to couple column 513 to column circuitry 533 (e.g., since column 512 is already coupled to column circuitry 533) or column circuitry 534 (e.g., since it has been identified as defective). Accordingly, column 513 can shift by two positions and alternatively coupled to column circuitry 535. Similarly, any columns following column 513 may also shift by two positions. As the end of the pixel array is approached, the columns may begin shifting to the alternative column circuitry as suitable. For example, as illustrated by FIG. 5, column 514 can shift two positions to couple to alternative column circuitry 540 and column 515 can shift two positions to couple to alternative column circuitry 542. Columns preceding any defective column circuitry may still couple to their default column circuitry. For example, column 510 can be positioned before both defective column circuitry 531 and 534 and thus may couple to its default column circuitry 530.

An imaging system can operate similar to FIG. 5 for any number of instances of defective column circuitry, provided there are enough instances of alternative column circuitry to skip the instance defective column circuitry. For example, if an imaging system includes three instances of defective column circuitry, the column corresponding to the first defective column circuitry and any following columns (e.g., up until the next defective column circuitry) can shift by one position, the column corresponding to the second defective column circuitry and any following columns (e.g., up until the next defective column circuitry) can shift by two positions, and the column corresponding to the third defective column circuitry and any following columns can shift by three positions. In this manner, an imaging system such as imaging systems 400 and 500 can allow defective column circuitry to be accounted for and their detrimental affects corrected, while still maintaining spatial accuracy.

In general, an imaging system such as imaging systems 400 and 500 can correct up to a number of instances of defective column circuitry that is equal to the number of instances of alternative column circuitry. For example, an imaging system with two instances of alternative column circuitry could skip and correct up to two instances of defective column circuitry, an imaging system with three instance of alternative column circuitry could skip and correct up to three instances of defective column circuitry, and so forth. An imaging system can thus be designed with a number of instances of alternative column circuitry to meet its expected needs.

Figure 8:
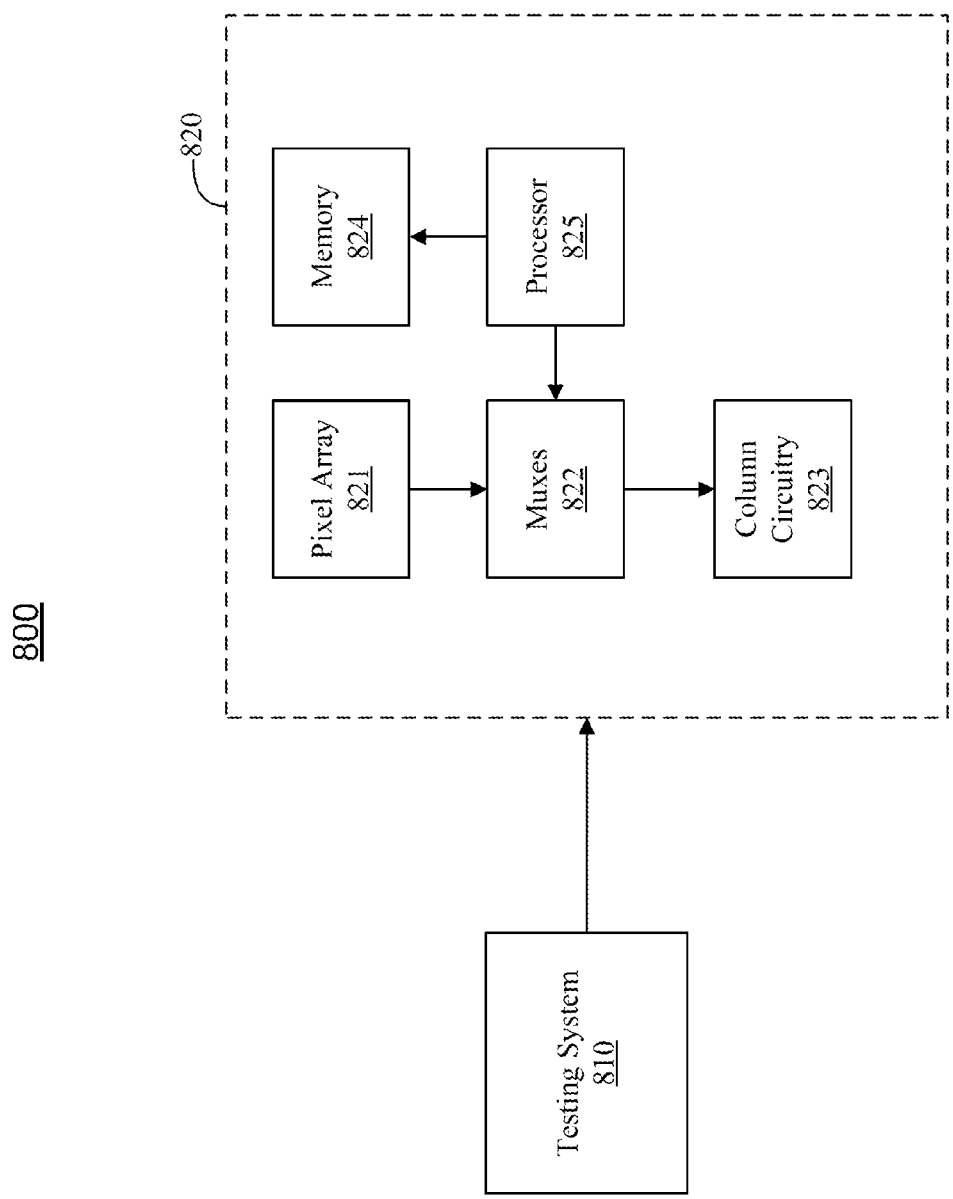
FIGS. 8 and 9 show a schematic views of illustrative systems for providing for the shifting of column circuitry in accordance with some embodiments of the present inventions.

As mentioned above, the columns of a pixel array can shift which column circuitry is used for readout in order to skip any defective column circuitry. In some embodiments, the defective column circuitry can first be identified and their identifying information stored in memory. During image acquisition (e.g., when the image signals of pixel cells are being readout), the memory may then be accessed and the multiplexers programmed accordingly to skip the defective column circuitry. For example, FIG. 6 shows an illustrative flowchart for calibrating such a memory, and FIG. 7 shows an illustrative flowchart for shifting column circuitry during image signal readout by accessing this memory. FIG. 8 shows an illustrative system for implementing processes 600 and/or 700 of FIGS. 6 and 7, respectively.

FIG. 6 shows process 600 for calibrating a memory to be used in shifting column circuitry. At step 602, the imaging system can be tested to determine whether any column circuitry is defective. Moreover, in response to column circuitry being defective, the address or other identifying information of the defective column circuitry can be identified at step 602.

At step 604, the identifying information of the defective circuitry can be programmed into memory. The memory can be any memory suitable for storing the identifying information, such as a non-volatile memory ("NVM"), a register, or any other suitable memory. In some embodiments, the memory can be physically close (e.g., to a processor of the imaging system that may access the memory) and easy to access, thus allowing the memory to be accessed quickly. This may, for example, aid the imaging system in meeting readout rates or other required timing constraints. In some embodiments, the memory can be in analog, thus also allowing for easy and quick access.

At step 606, the identifying information of the defective column circuitry can be accessed from the memory. For example, as will be described in greater detail below with regards to process 700 of FIG. 7, the identifying information can be used to shift column circuitry during image signal readout to skip the defective column circuitry identified at step 602.

FIG. 7 shows process 700 for shifting column circuitry during image signal readout. At step 702, the identifying information of defective column circuitry can be accessed from memory. For example, the identifying information determined at step 602 of process 600 and stored at step 604 of process 604 can be accessed. The identifying information can be accessed by any suitable device, such as a processor of the imaging system. As mentioned above with regards to step 604 of process 600, in some embodiments the memory can be physically close to and easily accessible by such a processor.

At step 704, multiplexers can be programmed based on the accessed identifying information. For example, the multiplexers can couple a column to its default column circuitry as well as to one or more instances of neighboring column circuitry or alternative column circuitry (e.g., as illustrated by FIGS. 4-5). The multiplexers can be programmed in a manner such that at least one instance of defective column circuitry is skipped and the following instances of column circuitry are suitably shifted in position. For example, such a configuration of skipping defective column circuitry and shifting the following instances is illustrated by FIG. 5. Generally, the column circuitry can be shifted the least number of positions while still skipping the desired number of instances of defective column circuitry. In some embodiments, this desired number of instances may be all instances of defective column circuitry, a minimum number of column circuitry such that the imaging system meets quality standards, or any other suitable number of instances of defective column circuitry.

At step 706, the image signals from the pixel cells can be readout. For example, the pixel cells can be readout sequentially or in any other suitable manner. Due to the programming of the multiplexers in step 704, the defective column circuitry can be avoided during this pixel cell readout.

In some embodiments, steps 704 and/or 702 can be performed prior to beginning a frame readout of the imaging system. In this manner, the bit pattern for programming the multiplexers can be shifted in and the multiplexers programmed directly before each frame readout. Pre-accessing the identifying information and/or pre-programming the multiplexers in this manner can help the imaging system to perform the frame readout in an efficient and quick manner. This, in turn, can help the imaging system to operate quickly, thus avoiding spatial errors and/or meeting any timing requirements that may be present. Alternatively, in some embodiments steps 702, 704, and/or 706 can be performed simultaneously. For example, the identifying information can be accessed and the multiplexers programmed as the frame readout progresses.

In some embodiments, some or all of the steps of process 600 of FIG. 6 can be performed during a wafer testing stage of the imaging system. For example, after a microchip has been fabricated, there may be one or more instances of column circuitry that were not formed correctly and are defective. During wafer testing, these defective instances can be located and their positions stored in memory (e.g., steps 602 and 604 of FIG. 6). During image acquisition, such as when the imaging system is being used by an end user or customer, the memory can be automatically accessed and the column circuitry suitably shifted (e.g., step 606 of FIG. 6 and process 700 of FIG. 7). In this manner, the shiftable column circuitry described herein can help improve wafer yields and reduce the number of imaging system wafers that must be discarded. For example, without the shiftable column circuitry, imaging systems with defective column circuitry may need to be discarded due to poor image quality and may not be able to be sold to end user. However, the shiftable column circuitry can allow such defective column circuitry to be bypassed, thus allowing the imaging system to still have high quality (e.g., despite the presence of defective column circuitry) and be suitable for end user use.

FIG. 8 shows a simplified schematic view of system 800 for providing for the shifting of column circuitry in accordance with some embodiments of the present inventions. System 800 can include testing system 810 and imaging system 820. Testing system 810 can include, for example, any suitable system used for testing imaging system 820 to identify defective instance of column circuitry and/or program identifying information (e.g., addresses) of this defective column circuitry into memory (e.g., memory 824). For example, testing system 810 may determine defective column circuitry in step 600 of process 600 and/or store the identifying information in memory 824 in step 604 of process 600. As another example, testing system 810 can be a testing system applied during wafer testing of the imaging systems.

Imaging system 820 may correspond to, for example, an imaging system such as imaging system 400 of FIG. 4. Similar to imaging system 400, imaging system 820 can include pixel array 821, multiplexers 822, and column circuitry 823 that can correspond to, for example, pixel array 702, multiplexers 450-454, and column circuitry 430-434 and 440 of FIG. 4, respectively. Imaging system 820 may moreover include memory 824 that can store the identifying information of the defective column circuitry (e.g., that was determined by testing system 810). For example, memory 824 can correspond to the memory of steps 604, 606, and 702 of processes 600 and 700, respectively. As mentioned above, memory 824 can include any suitable memory, such a non-volatile memory, a register, a memory in analog, or any other suitable memory. In some embodiments, memory 824 can be positioned physically close to processor 825 such that memory 824 can be accessed quickly.

Processor 825 can include any suitable processor for accessing the identifying information in memory 824 and/or programming multiplexers 822 based on this identifying information. For example, in some embodiments, processor 825 can access the identifying information at steps 702 of process 700 and program the multiplexers based on this identifying information at step 704 of process 700.

Figure 9:
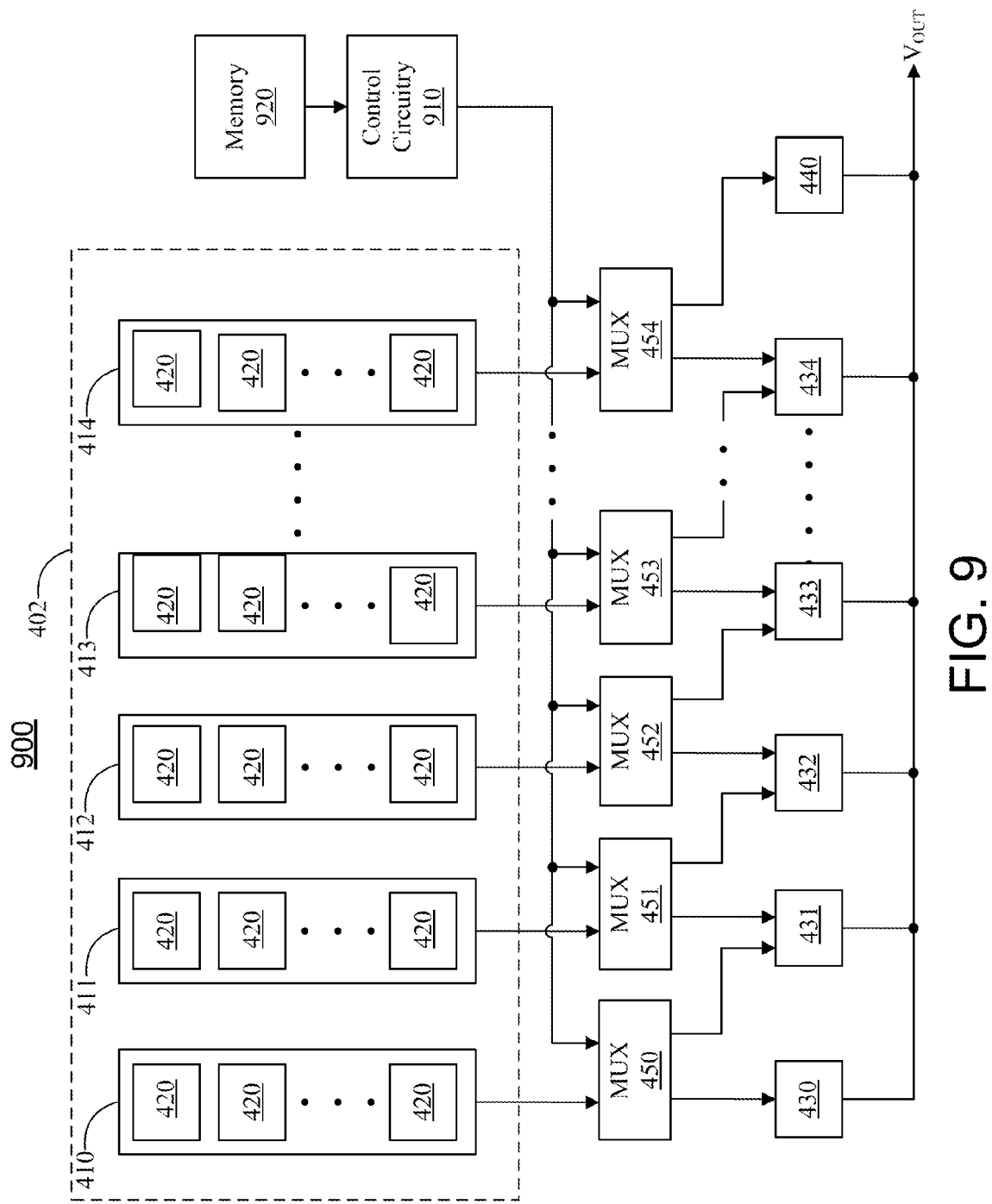

FIG. 9 shows system 900 that can illustrate in more detail how a processor or other control circuitry can couple to the multiplexers. For example, system 900 can be a particular example of the components' layout for system 800 of FIG. 8. However, the embodiment of system 900 is for the purpose of illustration and not for limitation, and one skilled in the art could appreciate that any other suitable configuration could be used to couple a processor or other control circuitry to multiplexers of switchable column circuitry.

In FIG. 9, the components with like numbering to the components of FIG. 4 can correspond to the same entities. For example, pixel array 402 of FIG. 9 can correspond to pixel array 402 of FIG. 4, pixel cells 420 of FIG. 9 can correspond to pixel cells 420 of FIG. 4, and so forth. In addition to the components of FIG. 4, system 900 can also include control circuitry 910 and memory 920. Control circuitry 910 may, for example, correspond to processor 825 of FIG. 8 or to any other suitable control circuitry for programming multiplexers 450-454. Similarly, memory 960 can correspond to memory 824 of FIG. 8 or to any other suitable memory that can store the identifying information of defective column circuitry.

As illustrated by FIG. 9, control circuitry 910 can be coupled to memory 920 and to each instance of multiplexers 450-454. At the appropriate time, control circuitry 910 can access memory 920 to read the identifying information of any defective column circuitry. Control circuitry 910 can then program multiplexers 450-454 in a manner that causes the defective column circuitry to be skipped and the columns of pixel array 402 to be suitably shifted, as described in the embodiments above. In some embodiments, control circuitry 910 can access memory 920 and program multiplexers 450-454 directly before each frame readout of system 900.

The processes discussed above are intended to be illustrative and not limiting. Persons skilled in the art can appreciate that steps of the processes discussed herein can be omitted, modified, combined, or rearranged, or that any combination of these steps or any additional steps can be performed without departing from the scope of the invention.

It will be apparent to those of ordinary skill in the art that methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:
1. An imaging system comprising:
a pixel array including a plurality of pixel cells arranged in a plurality of columns;
a plurality of column circuitry including a plurality of default column circuitry, wherein each column of the plurality of columns is associated with a different default column circuitry of the plurality of default column circuitry; and
a plurality of multiplexers, wherein each multiplexer is operable to switchably couple a different column of the plurality of columns to one of:
the default column circuitry associated with that different column; and
shift the different column in a first direction to at least one other column circuitry of the plurality of column circuitry that is physically adjacent to that different column, and to shift in the first direction away from the different column any column of the plurality of columns that follow the different column.
2. The imaging system of claim 1, wherein:
the plurality of column circuitry further includes at least one instance of alternative column circuitry; and
at least one multiplexer of the plurality of multiplexers switchably couples the different column to the at least one instance of alternative column circuitry.
3. The imaging system of claim 2, wherein the different column switchably coupled to that at least one alternative column circuitry is positioned near an end of a row of the pixel array.

4. The imaging system of claim 2, wherein the at least one instance of alternative column circuitry comprises between four and eight instances of alternative column circuitry.

5. The imaging system of claim 1 further including a memory operable to store identifying information of at least one defective instance of default column circuitry.

6. The imaging system of claim 5 further including a control circuit operable to access the identifying information; and to instruct, based on the identifying information, a multiplexer switchably coupled to the at least one defective instance and any following multiplexers to couple to the at least one other column circuitry.

7. The imaging system of claim 1 further including one or more alternate column circuitry wherein the plurality of multiplexers are operably coupled to shift in the first direction one of the columns that follow the different column to one of the one or more alternate column circuitry.

8. The imaging system of claim 5, wherein the memory comprises at least one of a non-volatile memory, a register, and a memory in analog.

9. The imaging system of claim 5, wherein the identifying information comprises an address of the at least one defective instance of default column circuitry.

* * * * *